(No Model.)

W. A. HANCE.
STOVE PIPE DAMPER.

No. 403,468. Patented May 14, 1889.

Witnesses,
Schuyler Dunzee
Harry C. Rohrer

Inventor,
William A. Hance
By Niles & Greene
Attorneys

UNITED STATES PATENT OFFICE.

WILLIAM A. HANCE, OF FREEPORT, ILLINOIS.

STOVE-PIPE DAMPER.

SPECIFICATION forming part of Letters Patent No. 403,468, dated May 14, 1889.

Application filed March 6, 1889. Serial No. 302,102. (No model.)

*To all whom it may concern:*

Be it known that I, WILLIAM A. HANCE, a citizen of the United States, residing at Freeport, in the county of Stephenson and State of Illinois, have invented certain new and useful Improvements in Stove-Pipe Dampers; and I do hereby declare the following to be a full, clear, and exact description of the invention, such as will enable others skilled in the art to which it appertains to make and use the same.

Figure 1:
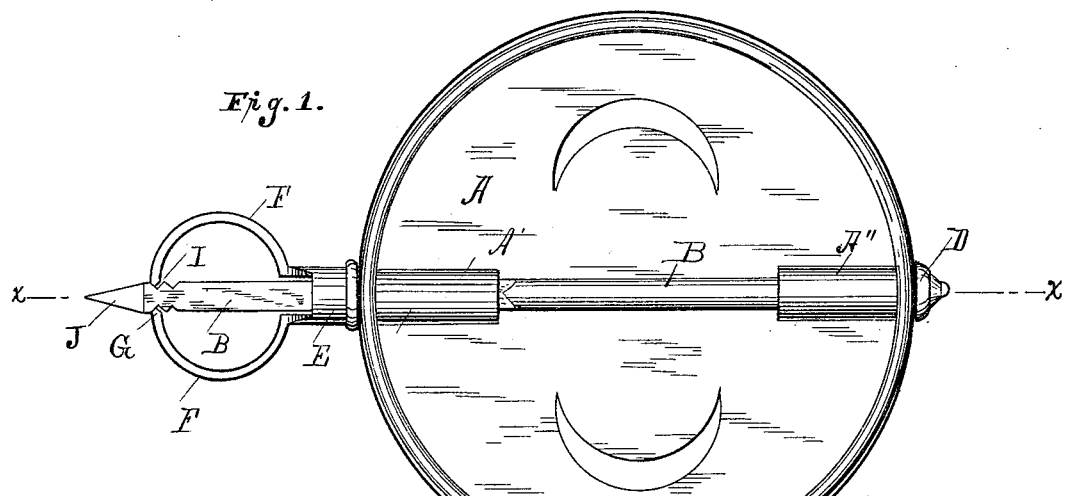
Figure 2:
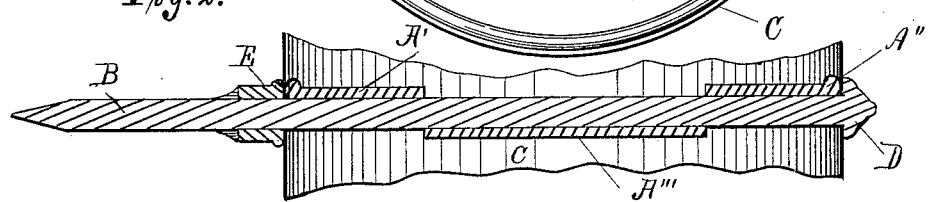
Figure 3:
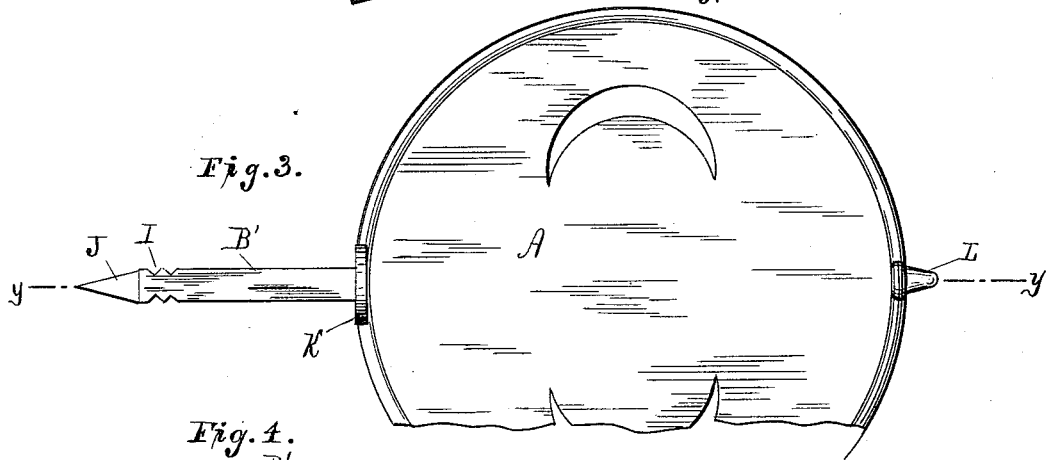
Figure 4:
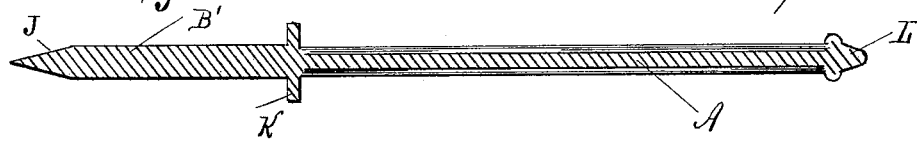

In the accompanying drawings, to which this specification refers, Figure 1 is a top view of the damper in position in a vertical pipe and so turned as to obstruct the draft. Fig. 2 is a section on the line $xx$, Fig. 1. Fig. 3 is a partial view, similar to Fig. 1, of a slightly-modified construction. Fig. 4 is a section on the line $yy$, Fig. 3.

In Figs. 1 and 2, A is a damper-plate of circular outline, having the usual apertures to prevent its entirely closing the pipe; and B is a spindle diametrically crossing and lying in the plane of the plate. The passage in which the spindle lies is spanned upon opposite faces of the plate by bridges A' A'' A''', so arranged that the passage is at all points open upon one or the other face of the plate. The spindle is materially longer than the diameter of the pipe, and has at one end a pyramidal point, J, and at the other a head, D, resting against the outer surface of the pipe. For nearly half its length from the pointed end it is squared, and a part of this squared portion lies in a correspondingly-formed part of the passage in the plate, so that both rotate together. Over the squared end is passed a closely-fitting collar, E, and from diametrically opposite sides of the collar project two integrally-formed or rigidly-attached springs, F, which diverge in the same plane and then return to the spindle, where their V-shaped or rounded ends enter corresponding notches, I, in the spindle's opposite faces. The parts are so proportioned that when the collar or sleeve E and the head D are both firmly pressed against the surface of the pipe the free ends of the springs rest against the outer walls of the corresponding notches, and as the elastic force of the springs tends to cause a nearer approach of their ends than the spindle will permit, the head D is drawn firmly against the pipe, and, by reaction, the sleeve E is pressed against the opposite side, thus securing friction enough to retain the damper in any position in which it may be placed. Extra notches are provided, in order that the device may be adapted to pipes of different diameters and that the friction may be increased, if desired. The springs themselves form a handle not likely to retain an objectionable degree of heat, and the angular point upon the spindle makes it the best possible simple tool for perforating the pipe.

Figs. 3 and 4 show the modification of forming the spindle B' integrally with the plate, the bridges, the body of the spindle B, and the head D being dispensed with, and the latter being replaced by a short gudgeon, L. At the junction of the spindle and plate is an integrally-formed completely circular friction-disk, K. The sleeve E with its springs are unchanged, except that friction is produced only between the disk and the sleeve.

Practically, if the springs F are flat and of a width equal to the length of the notches in which they lie, the part of the rod upon which the sleeve slides may be cylindrical, as the springs themselves will then secure the simultaneous rotation of the handle and spindle.

What I claim is—

1. The combination, with a damper-plate, of a spindle projecting therefrom and provided with V-shaped notches upon its opposite sides, the handle sliding upon said spindle, and the opposite spring-catches pressing upon the outer incline of said notches, substantially as and for the purpose set forth.

2. The combination of the damper-plate, the squared projecting spindle rotating therewith and having the pyramidal point and the notches upon its opposite faces, the sleeve adapted to slide upon said spindle, and the outwardly-bent springs formed integrally with the sleeve and having their free ends in engagement, respectively, with said notches, substantially as and for the purpose set forth.

In testimony whereof I affix my signature in presence of two witnesses.

WILLIAM A. HANCE.

Witnesses:
F. W. HANCE,
H. S. WEBSTER.